(12) United States Patent
Alcantar et al.

(10) Patent No.: US 11,260,742 B2
(45) Date of Patent: Mar. 1, 2022

(54) HYBRID VEHICLE

(71) Applicant: Ford Global Technologies, LLC, Dearborn, MI (US)

(72) Inventors: Jose Velazquez Alcantar, Canton, MI (US); Joe Jay Torres, Dearborn, MI (US); Peter James Barrette, Jupiter, FL (US); Richard David Bruns, Milford, MI (US); Corwin Stout, Ann Arbor, MI (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 426 days.

(21) Appl. No.: 16/117,459

(22) Filed: Aug. 30, 2018

(65) Prior Publication Data
US 2020/0070809 A1    Mar. 5, 2020

(51) Int. Cl.
*B60T 7/12* (2006.01)
*G05D 1/00* (2006.01)
(Continued)

(52) U.S. Cl.
CPC ............... *B60K 6/52* (2013.01); *B60K 6/445* (2013.01); *B60K 28/16* (2013.01); *B60W 10/06* (2013.01); *B60W 10/08* (2013.01); *B60W 10/119* (2013.01); *B60W 20/17* (2016.01); *B60W 20/20* (2013.01); *B60W 30/20* (2013.01); *B60W 2520/263* (2013.01); *B60W 2710/0666* (2013.01); *B60W 2710/083* (2013.01); *B60W 2710/085* (2013.01); *B60W 2720/403* (2013.01); *B60Y 2200/92* (2013.01)

(58) Field of Classification Search
CPC .......... B60K 6/445; B60K 6/52; B60K 28/16; B60K 6/448; B60W 10/06; B60W 10/08; B60W 10/119; B60W 20/17; B60W 2520/263; B60W 2710/0666; B60W 2710/083; B60W 2710/085; B60W 2720/403; B60W 30/20; B60W 20/20; B60W 2520/26; B60W 2710/081; B60W 30/18172; B60Y 2200/92; Y02T 10/62
See application file for complete search history.

(56) References Cited

U.S. PATENT DOCUMENTS 9,174,526 B2 * 11/2015 Yamamoto ........... B60K 17/356
9,463,697 B1 * 10/2016 Gauthier ................. B60L 50/51
(Continued)

FOREIGN PATENT DOCUMENTS

GB         2545217 A  *  6/2017  ............. B60L 3/108
WO     2017076862 A1     11/2017

*Primary Examiner* — Harry Y Oh
(74) *Attorney, Agent, or Firm* — David B Kelley; Brooks Kushman P.C.

(57) ABSTRACT

One axle of a hybrid vehicle is powered by an electric motor while a second axle of the vehicle is powered by a powertrain that includes an internal combustion engine. The electrically driven axle can be controlled in a speed control mode or in a torque control mode based on a driver demanded torque. The speed control mode is used when slip is detected at the electrically driven axle. The torque control mode is used when the electrically driven axle has traction. During a transition between these modes, the rate of change of torque is controlled to a predetermined level to mitigate noise, vibration, and harshness.

6 Claims, 6 Drawing Sheets

(51) Int. Cl.

| | |
|---|---|
| *G06F 7/00* | (2006.01) |
| *G06F 17/00* | (2019.01) |
| *B60K 6/52* | (2007.10) |
| *B60W 20/17* | (2016.01) |
| *B60K 6/445* | (2007.10) |
| *B60W 10/08* | (2006.01) |
| *B60W 10/119* | (2012.01) |
| *B60W 10/06* | (2006.01) |
| *B60W 30/20* | (2006.01) |
| *B60K 28/16* | (2006.01) |
| *B60W 20/20* | (2016.01) |

(56) References Cited

U.S. PATENT DOCUMENTS

| | | | |
|---|---|---|---|
| 9,656,541 B2 | 5/2017 | True et al. | |
| 2007/0187158 A1* | 8/2007 | Muta | B60K 28/16 |
| | | | 180/65.1 |
| 2013/0311055 A1* | 11/2013 | Whitney | B60W 10/02 |
| | | | 701/54 |
| 2014/0039743 A1* | 2/2014 | Park | B60L 3/0046 |
| | | | 701/22 |
| 2018/0229714 A1* | 8/2018 | McCullough | B60W 20/40 |
| 2021/0046827 A1* | 2/2021 | Greenwood | B60L 3/10 |

\* cited by examiner

HYBRID VEHICLE

TECHNICAL FIELD

This disclosure relates to the field of hybrid electric vehicle controls. More particularly, the disclosure pertains to a method of controlling the rear wheel torque of a four wheel drive hybrid electric vehicle.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Hybrid vehicle transmissions improve fuel economy by providing energy storage. In a hybrid electric vehicle, for example, energy may be stored in a battery. The battery may be charged by operating the engine to produce more power than instantaneously required for propulsion. Additionally, energy that would otherwise be dissipated during braking can be captured and stored in the battery. The stored energy may be used later, allowing the engine to produce less power than instantaneously required for propulsion and thereby consuming less fuel.

In two wheel drive vehicles, propulsion is provided by only the front wheels or only the rear wheels. In a four wheel drive vehicle, in contrast, all four wheels provide propulsion. Four wheel drive vehicles can improve mobility on surfaces with variable and margin coefficient of friction because some wheels retain traction when other wheels slip.

SUMMARY OF THE DISCLOSURE

A vehicle includes first and second axles and a controller. The first axle is powered by a first powertrain. The second axle is powered by a first electric motor. The first powertrain may include an internal combustion engine and a second electric motor. A planetary gear set may include a sun gear fixedly coupled to the second motor, a carrier fixedly coupled to the internal combustion engine, and a ring gear drivably connected to the first axle. A third electric motor may be driveably connected to the first axle. The controller is programmed to adjust a torque of the first electric motor in response to the state of the second axle. Specifically, in response to traction at the second axle, the controller adjusts a torque of the first electric motor to a driver demand based torque level. In response to slip of the second axle, the controller adjusts the torque of the first electric motor to a speed control torque level. During a transition between the driver demand based torque level and the speed control torque level, the controller sets a rate of change of torque of the first electric motor to mitigate noise, vibration, and harshness associated with rapid torque changes.

A method of controlling a hybrid vehicle sets a first motor torque based on a state of a first axle. The first motor torque is set to a first driver demand based torque level in response to traction at a first axle. The first motor torque is set to a speed control based torque level in response to slip of the first axle. The method transitions from the first driver demand based torque level to the speed control based torque level at a first controlled rate. The method may also transition from the speed control based torque level to the first driver demand based torque level at a second controlled rate. The transition from the speed control based torque level to the first driver demand based torque level may be in response to an absolute value of the first motor torque exceeding an absolute value of the driver demand based torque level or in response to an absolute value of the driver demand based torque level being less than a threshold. A powertrain torque to a second axle may be set to a second driver demand based torque level.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
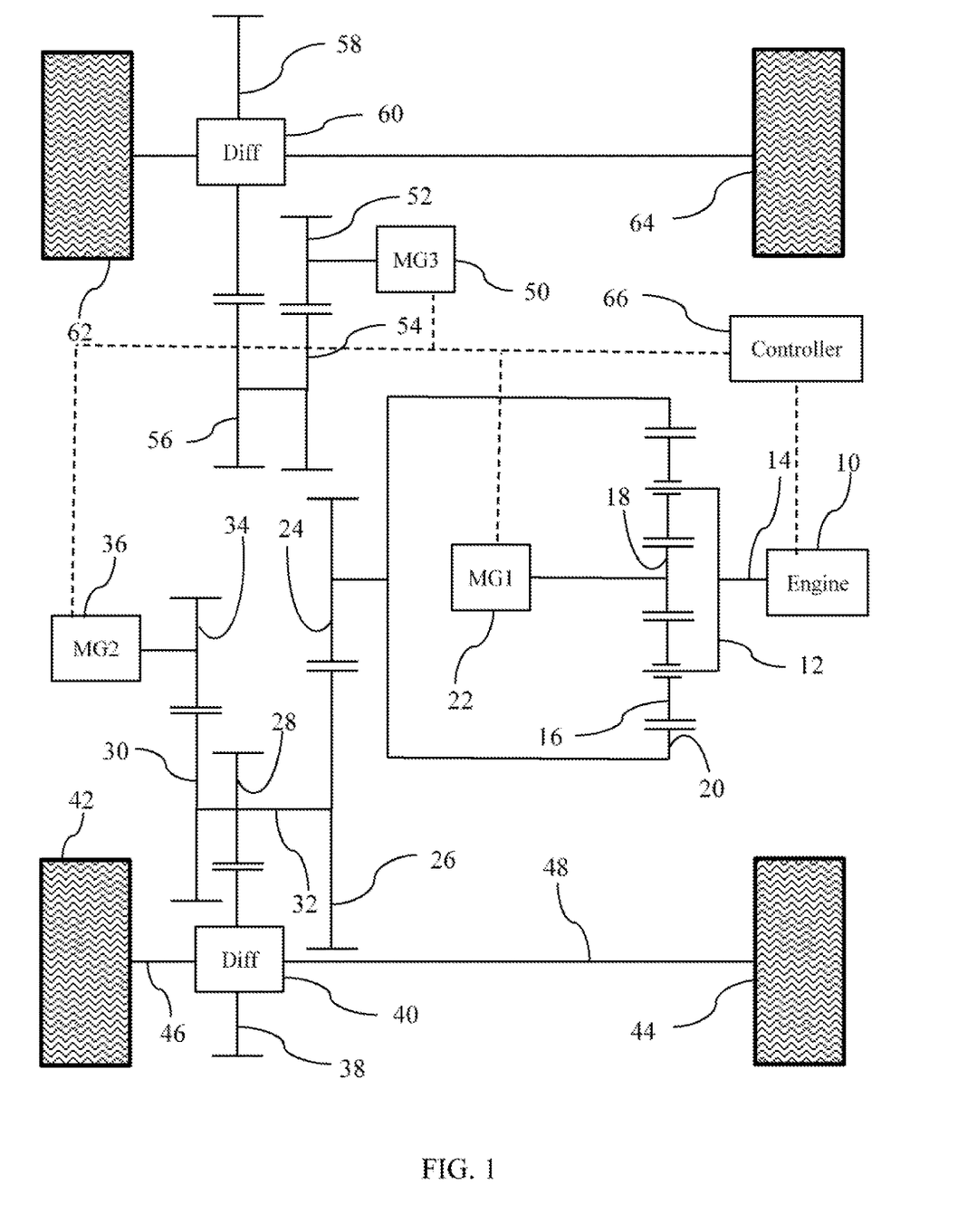
FIG. 1 is a schematic diagram of a four wheel drive hybrid electric vehicle powertrain.

FIG. 1 schematically illustrates a four wheel drive power-split type hybrid electric vehicle powertrain. Primary power is provided by engine 10 which is fixedly coupled to planet carrier 12 via transmission input shaft 14. A set of planet gears 16 are supported for rotation with respect to carrier 12. Sun gear 18 and ring gear 20 are each supported for rotation about the same axis as carrier 12 and each mesh with the planet gears 16. An electric machine 22, labelled MG1, is fixedly coupled to sun gear 18. Layshaft gear 24 is fixedly coupled to ring gear 20 and meshes with layshaft gear 26. Layshaft gear 26 is fixedly coupled to layshaft gears 28 and 30 via shaft 32. Layshaft gear 34 meshes with layshaft gear 30 and is fixedly couple to electric machine 36, labelled MG2. Layshaft gear 28 meshes with layshaft gear 38 which is the input to differential 40. Differential 40 drives front wheels 42 and 44 allowing slight speed differences as the vehicle turns a corner. Differential 40 and half-shafts 46 and 48 are collectively known as the front axle.

Electric machine 50, labelled MG3, drives a rear axle. MG3 is fixedly coupled to layshaft gear 52 which meshes with layshaft gear 54. Layshaft gear 54 is fixedly coupled to layshaft gear 56 which meshed with layshaft gear 58. Layshaft gear 58 is the input to differential 60. Differential 60 drives rear wheels 62 and 64 allowing slight speed differences as the vehicle turns a corner.

Electric machines 22, 36, and 50 are reversible electric machines. Each of these electric machines is capable of converting electrical power to mechanical power or converting mechanical power to electrical power. For example, each machine may be a synchronous motor in combination with an inverter.

In some circumstances, engine 10 may generate more power than is delivered to the vehicle wheels with the excess power stored in a battery (not shown). In other circumstances, power may flow from the battery permitting engine 10 to produce less power than the instantaneous demand of the vehicle. For example, the engine 10 may be off while power to propel the vehicles comes from the battery. Power to the front axle may come from a combination of engine power and battery power. Power to the rear axle comes exclusively from the battery.

The powertrain of FIG. 1 can be operated in a continuously variable mode with the battery neither providing nor absorbing power. The torque applied to generator 22 and the torque applied to layshaft gear 24 are both related to the torque generated by engine 10 based on the number of teeth on sun gear 18 and the number of teeth on ring gear 20. Specifically, $$T_{MG1} = \frac{N_{sun}}{N_{sun}+N_{ring}} T_{eng}$$

$$T_{gear24} = \frac{N_{ring}}{N_{sun}+N_{ring}} T_{eng}$$

where $T_{eng}$ is the torque generated by engine 10, $T_{MG1}$ is the torque absorbed by electric machine 22, $T_{gear24}$ is the torque absorbed by gear 24, $N_{sun}$ is the number of teeth on sun gear 18, and $N_{ring}$ is the number of teeth on ring gear 20. The engine speed is a weighted average of the generator speed and the speed of gear 24.

$$\omega_{eng} = \frac{N_{sun}}{N_{sun}+N_{ring}} \omega_{MG1} + \frac{N_{ring}}{N_{sun}+N_{ring}} \omega_{gear24}$$

When the vehicle is moving slowly, gear 24 rotates slowly and generator 22 rotates faster than engine 10. Power generated by the engine is split by the planetary gear set. A portion of the power is transmitted mechanically to shaft 32 from carrier 14 to ring gear 20 to gear 24 to gear 26. The remaining power is transmitted from sun 18 to generator 22 which converts the power to electrical power. Motor 36 converts the electrical power to mechanical power which is transmitted to shaft 32 by gear 34 and 30.

The torque of engine 10 and electric machines 22, 36, and 50 are set by a controller 66. The controller receives input from a variety of sensors, including driver manipulated sensors including an accelerator pedal, brake pedal, and steering wheel. From these sensors, the controller determines a driver demanded torque and then calculates how much torque each machine should be directed to produce, as discussed below. Alternatively, the vehicle may be an autonomous vehicle, in which case the controller directly computes the desired wheel torque in response to sensed traffic and road conditions. In the case of an autonomous vehicle, the term driver demanded torque means the controller calculated total desired wheel torque. The additional sensors indicate vehicle speed, axle speed (defined as the average of the corresponding wheels speeds), yaw rate, and lateral acceleration, among other parameters. Controller 66 may be a single microprocessor or multiple communicating microprocessors.

The vehicle may be operated in an All Wheel Drive (AWD) mode. In the AWD mode, a portion of the driver demanded torque is directed to the front axle and the remainder of the driver demanded torque is directed to the rear axle. In AWD mode, the tires are less likely to lose traction because each tire is transmitting less torque than in a two wheel drive mode. Furthermore, if one of the wheels does lose traction, the vehicle is still propelled by the wheels that retain traction. Also, vehicle handling may be improved. During braking, MG2 and MG3 may be commanded to generate negative torque such that vehicle kinetic energy is captured as electrical energy and stored in the battery.

Figure 2:
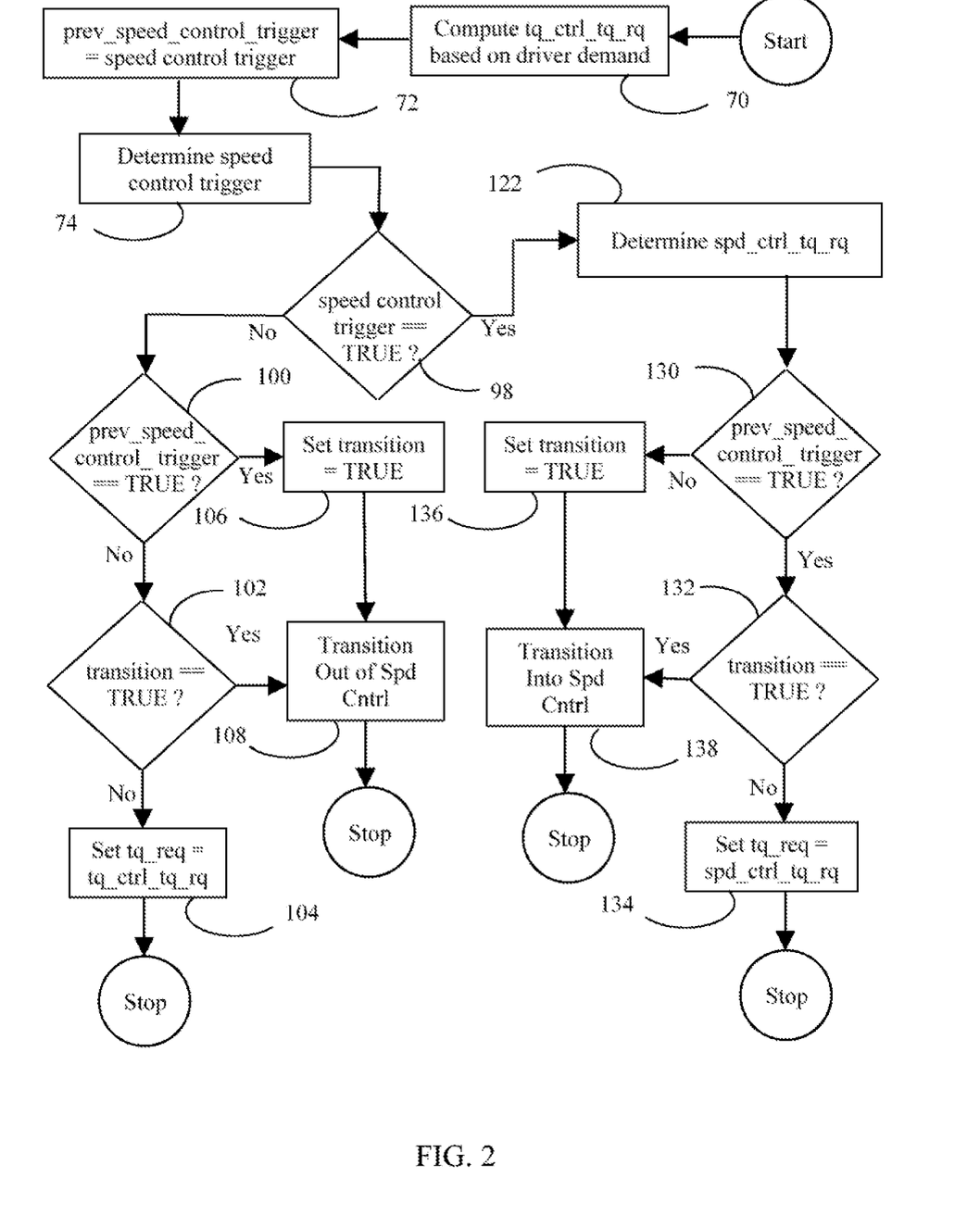
FIG. 2 is a top level flow chart for a method of operating one of the motors of the powertrain of FIG. 1.

FIG. 2 is a top level flow chart for determining the MG3 torque request. This routine is executed at regular intervals while the vehicle is in drive, reverse, or low. For example, the process may be executed in response to a controller interrupt. The controller is programmed to determine the MG3 torque request in a torque control mode when the rear axle has traction and in a speed control mode when rear wheel traction is limited. At 70, the controller calculates the request for the torque control mode based on driver demand. Specifically, the total wheel torque demand may be based on accelerator and brake inputs from the driver and vehicle speed. The total wheel torque demand is then divided between front and rear axles. The rear axle wheel torque demand is then adjusted based on the gear ratio between MG3 and the differential. The choice between torque control mode and speed control mode is recorded in the variable speed control trigger. At 72, the controller stores the choice from the previous time step for later reference.

Figure 3:
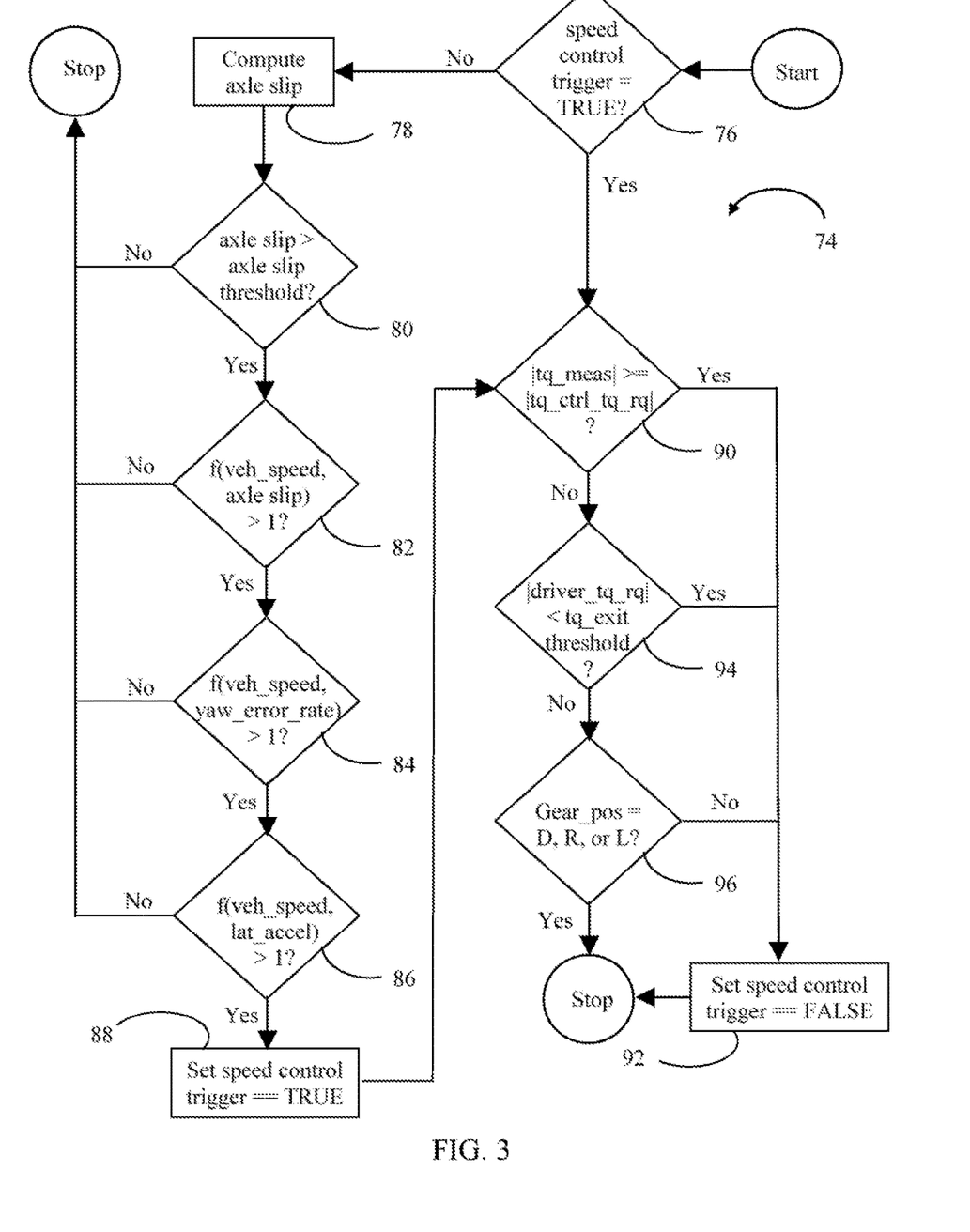
FIG. 3 is a flow chart for a sub-method to choose between a torque control mode and a speed control mode in the method of FIG. 2.

At 74, the controller decides whether to use sped control mode or torque control mode in the current time step. FIG. 3 is a flow chart for making this determination. At 76, the controller branches based on the previous mode. If speed control trigger is not TRUE, the controller proceeds to check whether speed control mode should be activated. At 78, the controller calculates the rear axle slip. Rear axle slip is calculated by comparing the average speed of the rear wheels to some other source of vehicle speed information, such as the average speed of the front wheels. At 80, the controller compares the rear axle slip to a threshold. If the slip is less than the threshold, then, the method terminates, staying in torque control mode. At 82, the controller calculates a function of vehicle speed and slip rate and exits if the function is less than 1. This has the effect of staying in torque control mode when the vehicle speed is high. At 84, the controller calculates a function of vehicle speed and yaw error rate and exits if the function is less than 1. At 86, the controller calculates a function of vehicle speed and lateral acceleration and exits if the function is less than 1. These steps have the effect of staying in torque control mode in turns. If these tests are satisfied, the controller sets the speed control trigger to TRUE at 88.

If the speed control mode is TRUE, either from a previous step or due to step 88, then the controller checks a series of conditions for staying in speed control mode. At 90, the controller compares the current measured MG3 torque to the torque control torque command. If the measured torque is larger, in absolute value, then the speed control trigger is set to FALSE at 92. At 94, the controller compares the driver request to a threshold. If the driver request is less, in absolute value, then the speed control trigger is set to FALSE at 92. Finally, at 96, the controller set the speed control trigger to FALSE if the gear position is something other than drive, reverse, or low.

Returning now to FIG. 2, the controller checks at 98 which mode has been selected and branches accordingly. If torque control mode is selected, the control checks at 100 whether the system was also in torque control mode on the previous time step. If so, the controller checks at 102 whether a transition flag is set to true, implying that the controller is in the process of transitioning from speed control to torque control mode. If not, then the controller simply sets the MG3 torque request to the torque control torque request at 104 and terminates. If, at 100, the controller finds that the system was in speed control at the previous time step, then the controller sets the transition flag to TRUE at 106.

Figure 4:
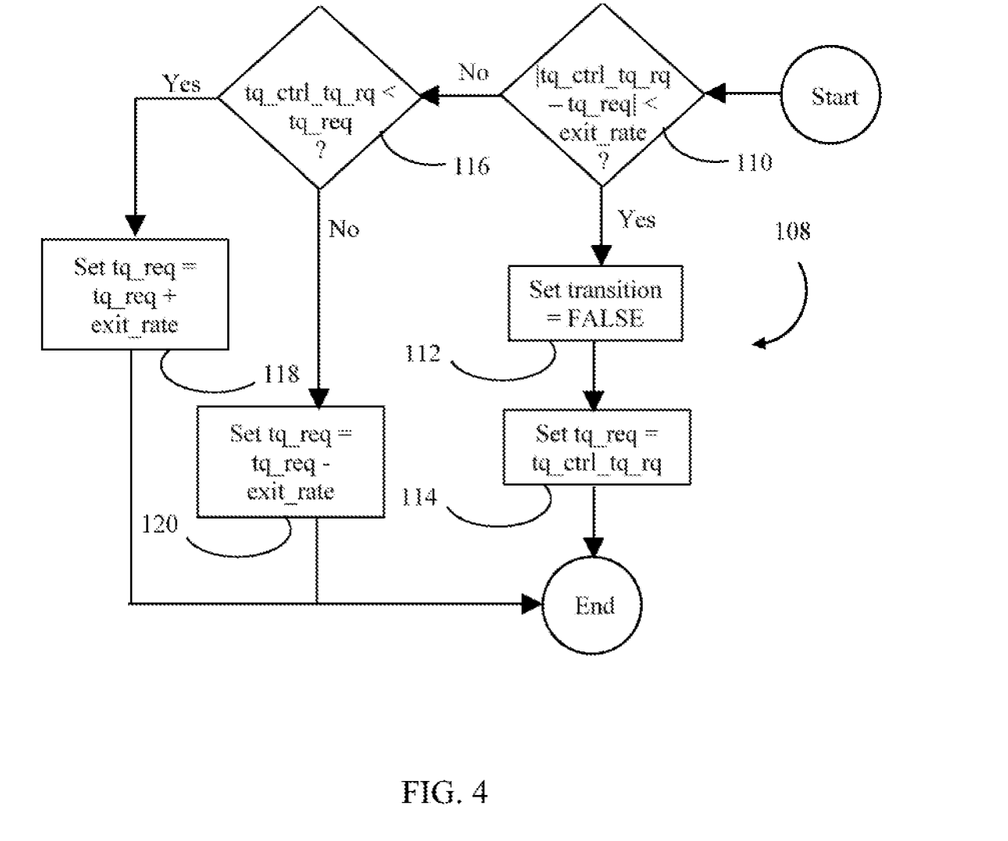
FIG. 4 is a flow chart for a sub-method to transition from the speed control mode to the torque control mode in the method of FIG. 2.

At 108, the controller sets the MG2 torque request according to a process for transitioning from speed control to torque control. This transition process is illustrated by the flowchart of FIG. 4. This route adjusts the MG3 torque requests at a predetermined rate called the exit rate until it reaches the torque control mode torque request. At 110, the controller compared the torque control torque request to the torque request from the previous time step. If an absolute value of the difference is less than the exit rate, then the controller sets the transition flag to FALSE at 112 and sets the MG3 torque request to the torque control torque request at 114. If the absolute value of the difference is greater than the exit rate, then the controller checks at 116 which direction to adjust the torque request. If the torque control torque request is less than the previous torque request at 116, then the controller increments the MG3 torque request at 118. On the other hand, if the torque control torque request is greater than the previous torque request at 116, then the controller decrements the MG3 torque request at 120.

Figure 5:
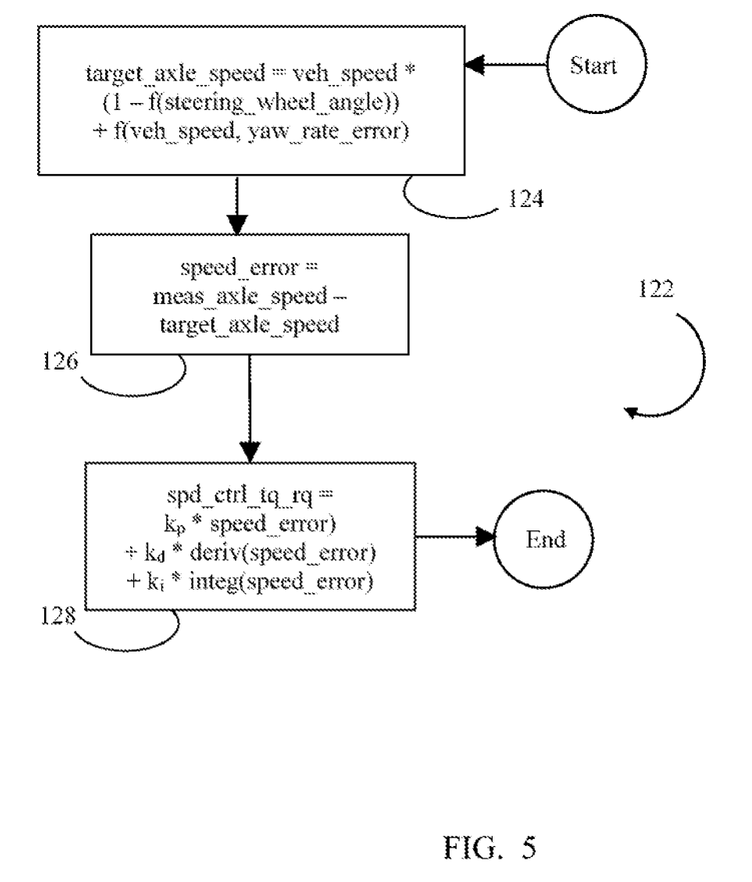
FIG. 5 is a flow chart for a sub-method to set the torque request in speed control mode in the method of FIG. 2.

Returning now to FIG. 2, if the speed control flag is set to TRUE at 98, then the controller calculates the speed control torque request at 122. This calculation is illustrated by the flow chart of FIG. 5. At 124, the control computes a target axle speed. This target is primarily based on vehicle speed with appropriate compensation for tire radius. The vehicle speed is measured in some manner independent of the rear axle speed, such as by using the front axle speed or global position system. Adjustments are made based on the steering wheel angle and the yaw rate error. At 126, a speed error is calculated by subtracting the target axle speed from a measured rear axle speed. The rear axle speed may be measured, for example, by averaging the speeds of the rear wheels. At 128, the speed control torque request is calculated from the speed error using proportional, derivative, and integral terms.

Figure 6:
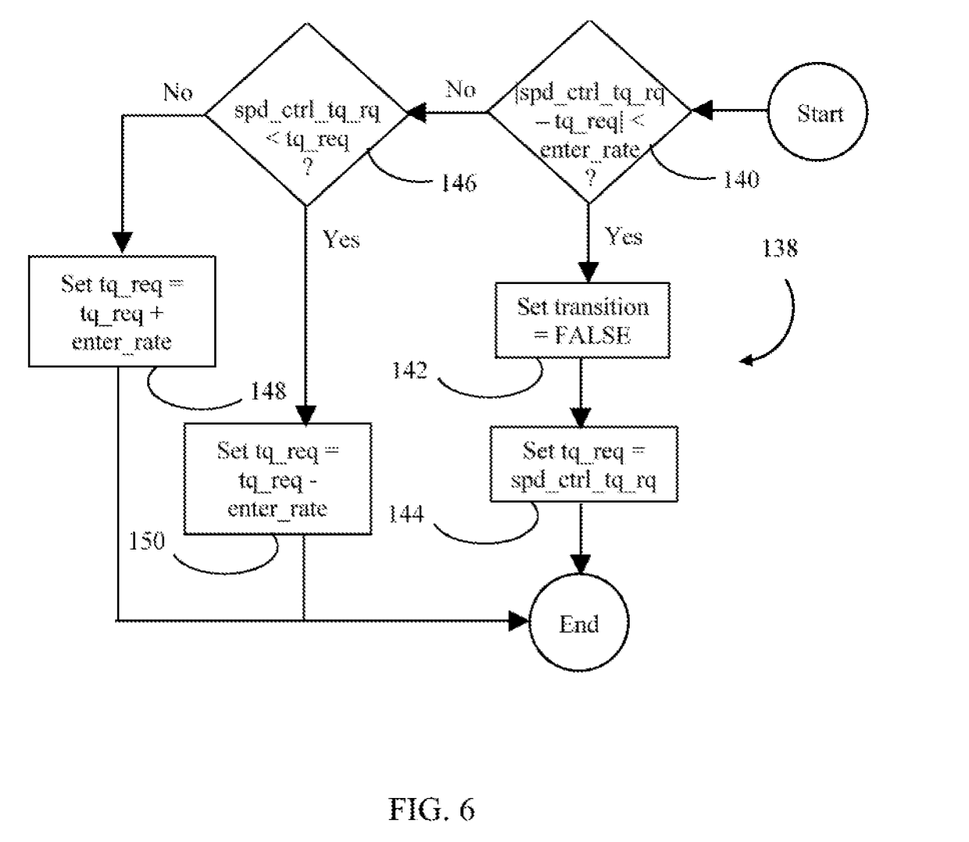
FIG. 6 is a flow chart for a sub-method to transition from the torque control mode to the speed control mode in the method of FIG. 2.

Returning to FIG. 2, at 130 the controller checks whether speed control was active on the previous iteration. If it was, then the controller checks at 132 whether the transition flag is TRUE. If not, then the MG3 torque request is set to the speed control torque request at 134. If speed control was not active at the previous time step, as determined at 130, then the controller sets the transition flag to TRUE at 136. At 138, the controller manages a transition from torque control to speed control. The transition into speed control is illustrated by the flowchart of FIG. 6. This transition process ensures that the torque request change at a predetermined rate, enter_rate per time step, until the current value of the speed control torque request is reached. At 140, the controller checks whether the difference between the previous torque request and the speed control torque request is less than the enter rate. If so, the transition is completed by setting the transition flag to FALSE at 142 and setting the MG3 torque request to the speed control torque request at 144. Otherwise, the controller checks at 146 whether the speed control torque request is greater than or less than the previous MG3 torque request and either increments or decrements the torque request at 148 or 150 accordingly.

Operating MG3 in the manner described above has several advantages. When the rear wheels have good traction, the MG3 torque is determined based on driver demand. As a result, the total driver demanded torque is distributed between the front and rear wheels. With the torque distributed, the wheels are less likely to lose traction when encountering a road surface with a marginal coefficient of friction. When the rear wheels have lost traction, the MG3 torque is controlled in a speed control mode with the speed target based primarily on vehicle speed. In the speed control mode, the rear wheel torque is controlled to facilitate regaining traction and to keep the vehicle moving through a slippery patch. The transitions between these two operating modes are not abrupt. Instead, the torque changes at a steady, predetermined rate. This predetermined rate is calibrated to mitigate noise, vibration, and harshness concerns that may occur when the rear wheel torque changes too abruptly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A method of controlling a hybrid vehicle comprising:
setting a first motor torque via a controller to a first driver demand based on a torque control mode in response to a slip of a first axle being less than a threshold;
setting the first motor torque via the controller based on a speed control mode in response to the slip of the first axle exceeding the threshold;
transitioning the first motor torque from the torque control mode to the speed control mode at a first predetermined rate via the controller in response to an increase in the slip of the first axle from less than the threshold to greater than the threshold; and transitioning the first motor torque from the speed control mode to the torque control mode via the controller at a second predetermined rate.

2. The method of claim 1 further comprising initiating the transition from the speed control mode to the torque control mode via the controller in response to an absolute value of the first motor torque exceeding an absolute value of the first driver demand.

3. The method of claim 2 further comprising initiating the transition from the speed control mode to the torque control mode via the controller in response to an absolute value of the first driver demand being less than a threshold.

4. The method of claim 1 further comprising setting a powertrain torque to a second axle to a second driver demand based on the torque control mode.

5. The method of claim 4 wherein setting the powertrain torque comprises setting a second motor torque.

6. The method of claim 4 wherein setting the powertrain torque comprises setting an internal combustion engine torque.

* * * * *